(12) United States Patent
Takechi et al.

(10) Patent No.: US 10,193,188 B2
(45) Date of Patent: Jan. 29, 2019

(54) AQUEOUS ELECTROLYTE WITH ETHERS AND BATTERIES USING THE ELECTROLYTE

(71) Applicant: TOYOTA MOTOR ENGINEERING & MANUFACTURING NORTH AMERICA, INC., Erlanger, KY (US)

(72) Inventors: Kensuke Takechi, Ann Arbor, MI (US); Ruidong Yang, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 156 days.

(21) Appl. No.: 15/252,513

(22) Filed: Aug. 31, 2016

(65) Prior Publication Data
US 2018/0062205 A1    Mar. 1, 2018

(51) Int. Cl.
| | |
|---|---|
| *H01M 10/36* | (2010.01) |
| *H01M 10/0567* | (2010.01) |
| *H01M 10/0569* | (2010.01) |
| *H01M 10/0568* | (2010.01) |
| *H01M 10/0525* | (2010.01) |

(52) U.S. Cl.
CPC ....... *H01M 10/36* (2013.01); *H01M 10/0525* (2013.01); *H01M 10/0567* (2013.01); *H01M 10/0568* (2013.01); *H01M 10/0569* (2013.01); *H01M 2220/20* (2013.01); *H01M 2300/0002* (2013.01)

(58) Field of Classification Search
None
See application file for complete search history.

(56) References Cited

U.S. PATENT DOCUMENTS

| | | | |
|---|---|---|---|
| 6,344,293 B1 * | 2/2002 | Geronov | H01M 4/602 |
| | | | 429/213 |
| 6,645,667 B1 | 11/2003 | Iwamoto et al. | |
| 8,507,130 B2 | 8/2013 | Kondo et al. | |
| 8,828,574 B2 | 9/2014 | Visco et al. | |
| 8,828,575 B2 | 9/2014 | Visco et al. | |
| 2015/0214555 A1 | 7/2015 | Visco et al. | |
| 2015/0311516 A1 | 10/2015 | Chen et al. | |
| 2016/0218394 A1 * | 7/2016 | Yamada | H01G 9/145 |

FOREIGN PATENT DOCUMENTS

JP    2011-154783    8/2011

* cited by examiner

*Primary Examiner* — Sin J Lee
(74) *Attorney, Agent, or Firm* — Oblon, McClelland, Maier & Neustadt, L.L.P.

(57) ABSTRACT

An aqueous electrolyte composition suitable for a lithium ion battery is provided. The aqueous electrolyte composition contains water, at least one of a linear ether and a cyclic ether and a lithium fluoroalkylsulfonyl salt. A lithium ion battery containing the aqueous electrolyte and a vehicle at least partially powered by the battery are also provided.

10 Claims, 6 Drawing Sheets

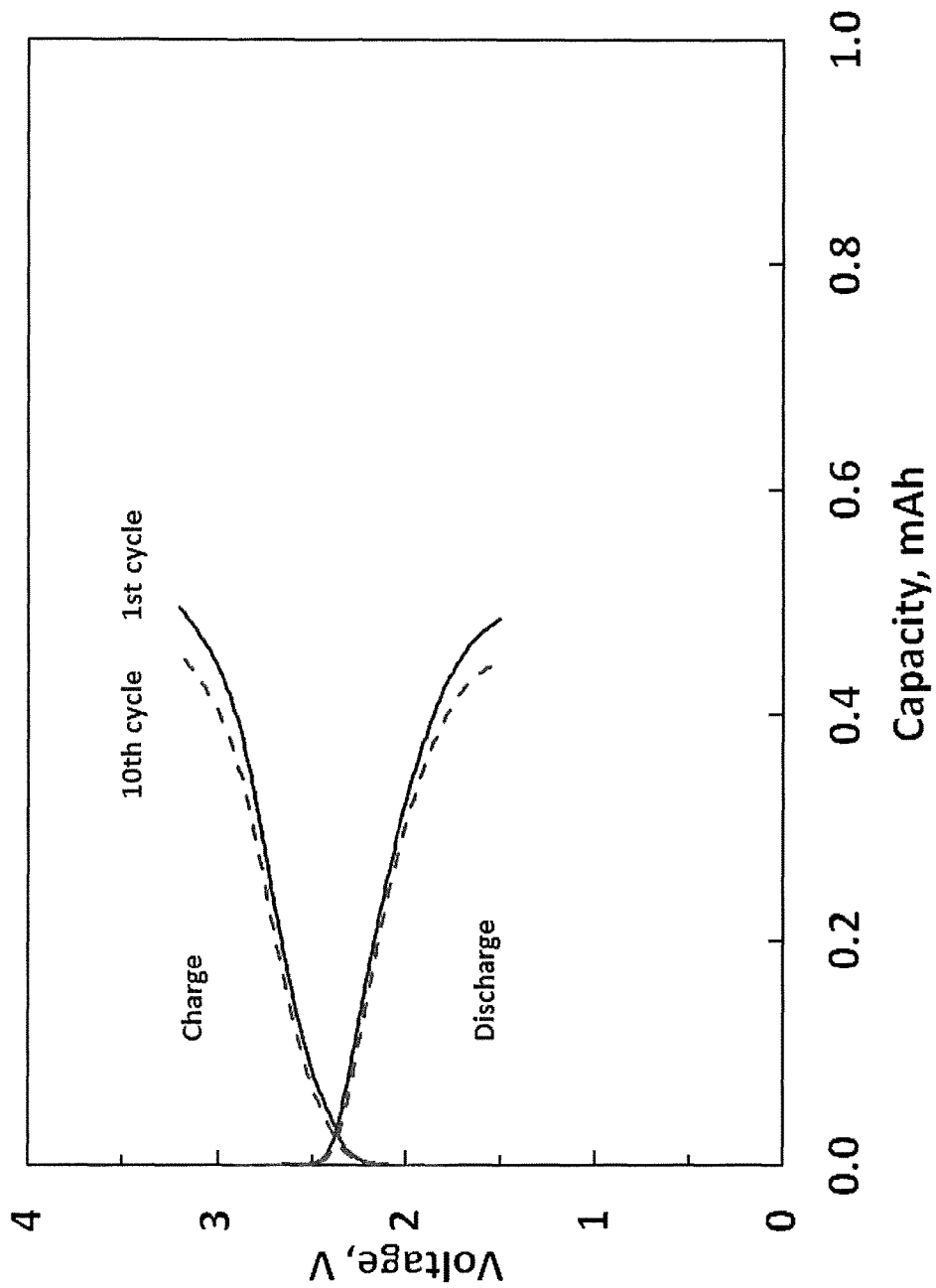

AQUEOUS ELECTROLYTE WITH ETHERS AND BATTERIES USING THE ELECTROLYTE

BACKGROUND

Field of the Disclosure

This disclosure is directed an aqueous electrolyte composition suitable for use in high energy batteries, including lithium ion secondary batteries, which provide a wide electrochemical window of performance and increased safety and convenience in vehicle construction.

Discussion of the Background

With the significant and growing increase in commercialization and further development of electrified vehicles (EV) including partial hybridized vehicles (PHV) and hybridized vehicles (HV), there is a requirement for intrinsically safe high-energy batteries. Lithium-ion batteries have been predominantly employed in the construction of EV units to date; however, current commercial Li-ion secondary batteries employ a flammable non-aqueous electrolyte, and as a consequence, control circuits and internal safety components must be installed as part of the battery system. These added units add weight and expense to the vehicle and require complicated construction features be added to the vehicle.

On the other hand, batteries using aqueous (water-based) electrolyte, such as nickel metal hydride (Ni-MH) batteries, are much safer because the aqueous electrolyte is inflammable. Unfortunately, aqueous electrolyte batteries known to date do not provide the energy density necessary to compete with or replace current Li-ion batteries, because the electrochemical stability of the aqueous electrolyte has a low voltage profile (<2 V). In the case of the conventional aqueous electrolytes, the electrochemical stability (electrochemical window) is limited by the decomposition voltage of the water, which is usually less than 2 V.

One effort to widen the electrochemical window by suppression of the decomposition has included preparing a highly concentrated aqueous electrolyte composition and such systems may perform with an electrochemical window as wide as about 3 V. In one system for a lithium-ion battery electrolyte the composition contains a high concentration of a Li-salt (21 m) which is believed to stabilize the water by formation of a complex between the salt and the water molecule. Since the window of the free-water (bulk water, regular water), which has clusters of water molecules, is different from the window of individual water molecules, the water molecules coordinated by highly concentrated salt ions can behave like the "individual water molecules" to have wider electrochemical window.

However, the limit of the reduction (negative) voltage of the window of such systems is about 1.8 V (vs Li/Li+) and this value of reducing voltage limits the candidates suitable for utility as anode materials. For example, one anode material presently of high interest, lithium titanium oxide ($Li_4Ti_5O_{12}$) (LTO), would not be suitable in such a battery system because the redox potential of LTO is about 1.5 V.

Accordingly, one object of the present invention is to provide an aqueous electrolyte composition having an electrochemical window sufficiently wide to be compatible and functional in a secondary battery having anode and cathode materials which provide high energy density.

Another object of the present invention is to provide an aqueous electrolyte system for a lithium-ion secondary battery having an electrochemical window sufficiently wide to be compatible and functional in a secondary battery having anode and cathode materials which provide high energy density.

A further object of the invention is to provide a lithium ion secondary battery having an aqueous electrolyte which has an energy density equal to or greater than present conventional lithium-ion batteries.

SUMMARY OF THE DISCLOSURE

These and other objects have been achieved by the present disclosure, the first embodiment of which includes an aqueous electrolyte for a lithium-ion secondary battery comprising:
water;
at least one of a linear ether and a cyclic ether; and
a lithium salt of an anion comprising a fluoroalkylsulfonyl group of formula (I):

R—SO2-    (I)

wherein R is a perfluoroalkyl group of 1-5 carbons.

In another embodiment, the present invention includes a lithium ion battery, comprising:
an anode capable of intercalation and de-intercalation of lithium ions;
a cathode capable of intercalation and de-intercalation of lithium ions; and
an aqueous electrolyte in contact with the anode and cathode which comprises:
water;
at least one of a linear ether and a cyclic ether; and
a lithium salt of an anion comprising a fluoroalkylsulfonyl group of formula (I):

R—SO2-    (I)

wherein R is a perfluoroalkyl group of 1-5 carbons.

The foregoing description is intended to provide a general introduction and summary of the present disclosure and is not intended to be limiting in its disclosure unless otherwise explicitly stated. The presently preferred embodiments, together with further advantages, will be best understood by reference to the following detailed description taken in conjunction with the accompanying drawings.

BRIEF DESCRIPTION OF THE DRAWINGS

FIG. 6 shows the charge/discharge curves (the $1^{st}$ and the $10^{th}$ cycles) obtained for Example 5.

DETAILED DESCRIPTION OF THE DISCLOSURE

Figure 1:
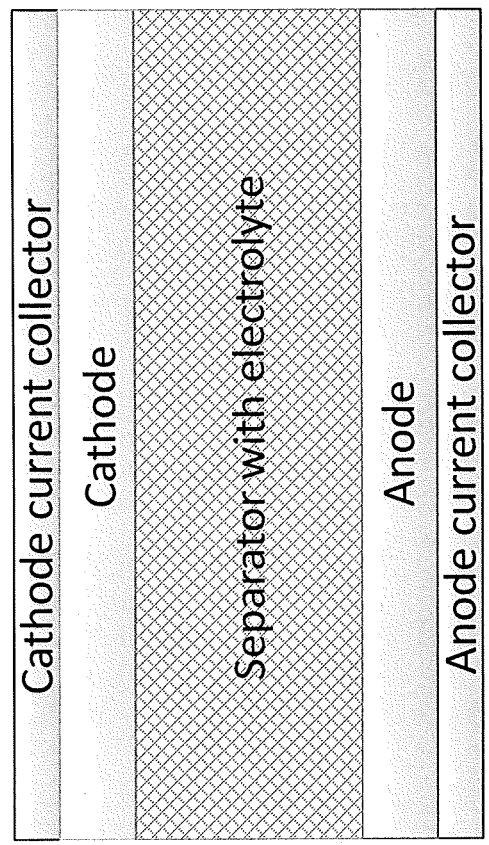
FIG. 1 shows a battery cell configuration employed for evaluation of the electrolyte systems of the Examples.

Within the description of this disclosure, all cited references, patents, applications, publications and articles that are under authorship, joint authorship or ascribed to members of the Assignee organization are incorporated herein by reference. Where a numerical limit or range is stated, the endpoints are included. Also, all values and subranges within a numerical limit or range are specifically included as if explicitly written out. As used herein, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted. Where % composition description is provided the % values are % by weight unless specified otherwise. As used herein, the term "vehicle" refers to any power driven device designed for transportation including an automobile, truck van, bus, golf cart and other utility forms of transportation.

To further widen the electrochemical window, the inventors have surprisingly discovered that the water component of an electrolyte system may be strongly stabilized in a composition containing a chemical component in addition to a concentrated salt. Explicitly, it was discovered that a highly stabilized electrolyte system for a lithium-ion battery having a wide electrochemical window may be obtained by including a lithium salt of an anion having a fluoroalkylsulfonyl group and a linear or a cyclic ether in the aqueous composition. Thus, in a first embodiment, an aqueous electrolyte composition comprising water, a lithium salt of an anion having at least one fluoroalkylsulfonyl group and at least one of a linear and a cyclic ether is provided.

Not wishing to be bound by theory, the inventors believe that the fluoroalkylsulfonyl (R—SO2-) group wherein R is a perfluoroalkyl group of 1-5 carbons provides flexibility in the molecular structure of the anion which serves to interact with and stabilize a water molecule. Nonlimiting examples of suitable lithium salts include lithium bis(trifluoromethylsulfonyl)imide (LiTFSI), lithium bis(pentafluoroethyl-sulfonyl)imide (LiBETI), lithium bis(fuoromethylsulfonyl)imide (LiFSI) and lithium trifluoromethylsulfonate (LiTFS).

The linear or cyclic ether may be any ether sufficiently compatible with water and the lithium fluoroalkylsulfonyl group containing salt to provide a homogeneous electrolyte composition. Nonlimiting examples include dimethoxyethane (DME, Glyme), diethylene glycol dimethyl ether (Diglyme), triethylene glycol dimethyl ether (Triglyme), tetraethylene glycol dimethyl ether (Tetraglyme), polyethylene glycol dimethyl ether (PEGDME) and tetrahydrofuran (THF).

The inventors have determined that in order to obtain an electrolyte composition with sufficiently stabilized water to prepare an aqueous lithium ion battery, the electrolyte composition may have relative mole ratios of ether (Y) and water (Z) to Li-salt (X) which satisfy the following formulas:

Y/X is from 1/10 to 50/1; and

Z/X is from 1/10 to 5/1.

Preferably, Y/X is from 1/2 to 20/1 and Z/X is from 1/2 to 5/1.

In the case of long chain polyethylene glycol dimethyl ethers (PEGDME) of the formula:

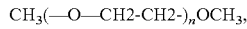

Y is calculated as n/4. For example, if the average value of "n" is 12 "Y" for that polyether is 3. For those ethers with "n" of 4 or less, "Y" is "1."

The lithium salt of an anion comprising a fluoroalkylsulfonyl group of formula (I) may be present in the electrolyte at a concentration of from 2M to 20 M, preferably from 2M to 15M and most preferably from 2M to 10M.

In another embodiment an aqueous lithium ion battery is provided. The battery comprises: an anode capable of intercalation and de-intercalation of lithium ions; a cathode capable of intercalation and de-intercalation lithium ions; and an aqueous electrolyte in contact with the anode and cathode which comprises: water, at least one of a linear ether and a cyclic ether, and a lithium fluoroalkylsulfonyl salt.

Aqueous rechargeable lithium ion batteries (ARLB) must contain electrodes stable and compatible with water. Generally, any material capable of intercalation and de-intercalation of Li ions which is stable to exposure to water under electrochemical conditions may be employed.

Suitable cathode materials which are compatible with an aqueous electrolyte and have an appropriate redox potential of less than 5.5 V vs Li/Li+ include but are not limited to: $LiMn_2O_4$, $LiCoO_2$, $LiFe(PO_4)$, $LiMn_{1/3}Ni_{1/3}Co_{1/3}O_2$, $LiNi_{0.5}Mn_{1.5}O_4$ and $LiCoPO_4$. Porous forms of any these may be prepared and nanoparticle structure may be especially useful as active cathode materials.

The cathode may be prepared by mixing the particles according to at least one the above materials with one or more binders and other materials conventionally employed to prepare a cathode structure for an aqueous electrolyte system. These materials may be mixed as a slurry, coated onto a metal foil, and dried. The methods of construction of a cathode employing an active material are conventionally known and any such method that is compatible with the particles of the disclosure may be employed.

Suitable binders known to one of ordinary skill which are chemically stable in the potential window of use of the cell may include thermoplastics and thermosetting resins. For example, polyethylene, polypropylene, polytetrafluoroethylene (PTFE), polyvinylidene fluoride (PVDF), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

The components may be wet blended in the presence of a suitable solvent or dry blended using a mortar or other conventionally known mixing equipment. The mixture may then be applied to a charge collector by conventionally known methods. Any suitable charge collector may be employed. Preferred charge collectors may be any of carbon, stainless steel, nickel, aluminum and copper.

The cathode thus prepared may be employed in the construction of an aqueous lithium-ion battery in a conventionally known manner.

The lithium salt of an anion comprising a fluoroalkylsulfonyl group of formula (I) as listed above may be present in the electrolyte at a concentration of from 2M to 20 M, preferably from 2M to 15M and most preferably from 2M to 10M.

With regard to the anode any kind of material suitable for utility in a Li-ion battery, which is compatible with aqueous electrolyte and has appropriate redox potential (greater than 0.5 V vs Li/Li+) may be employed. Suitable examples include, but are not limited to $Li_4Ti_5O_{12}$, elemental sulfur, $Mo_6S_8$, $Cu_2V_2O_7$, $TiS_4$, $NbS_5$ and Li terephthalate. Porous forms of any these may be prepared and nanoparticle structure may be especially useful.

The anode may be prepared by mixing the particles according to at least one the above anode materials with one or more binders and other materials conventionally employed to prepare an anode structure for an aqueous electrolyte system. These materials may be mixed as a slurry, coated onto a metal foil, and dried. The methods of construction of a anode employing an active material are conventionally known and any such method that is compatible with the particles of the disclosure may be employed.

Suitable binders known to one of ordinary skill which are chemically stable in the potential window of use of the cell may include thermoplastics and thermosetting resins. For example, polyethylene, polypropylene, polytetrafluoroethylene (PTFE), polyvinylidene fluoride (PVDF), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

The components may be wet blended in the presence of a suitable solvent or dry blended using a mortar or other conventionally known mixing equipment. The mixture may then be applied to a charge collector by conventionally known methods. Any suitable charge collector may be employed. Preferred charge collectors may be any of carbon, stainless steel, nickel, aluminum and copper.

The battery further comprises a separator between the anode and cathode and any type of conventionally known separator compatible with an aqueous electrolyte may be employed.

The battery may be enclosed in a container and multiple units may be combined to form a battery as is conventionally known.

Preparation and charge/discharge performance evaluation of batteries according to an embodiment as shown in FIG. 1 are described in Examples 1 to 5 below. The charge discharge curves for each battery are shown in FIGS. 2 to 6 and as indicated the batteries are stable over the cycles demonstrated and have good capacity.

In further embodiments the present disclosure includes a vehicle containing the battery according to the present disclosure wherein the vehicle includes an automobile, truck van, bus, golf cart and other utility forms of transportation.

Having generally described this disclosure, a further understanding can be obtained by reference to certain specific examples which are provided herein for purposes of illustration only and are not intended to be limiting unless otherwise specified.

Experimental

Coin cell batteries of the 2032-type shown schematically in FIG. 1 were prepared with a cathode having in an active layer LiMn$_2$O$_4$ and conductive carbon with a PVdF binder. The anodes were prepared with Li$_4$Ti$_5$O$_{12}$ and conductive carbon with a PVdF binder. A Separator constructed of a Glass fiber separator was placed between the anode and cathode. The electrolyte composition for each Example is shown in the following Table. To evaluate charge/discharge performance of the battery the battery was first charged at 1.0 mA/cm$^2$ to a cut-off of 3.2 V. The battery was then discharged at 1.0 mA/cm$^2$ to a cut-off of 1.5 V at 25° C.

Figure 2:
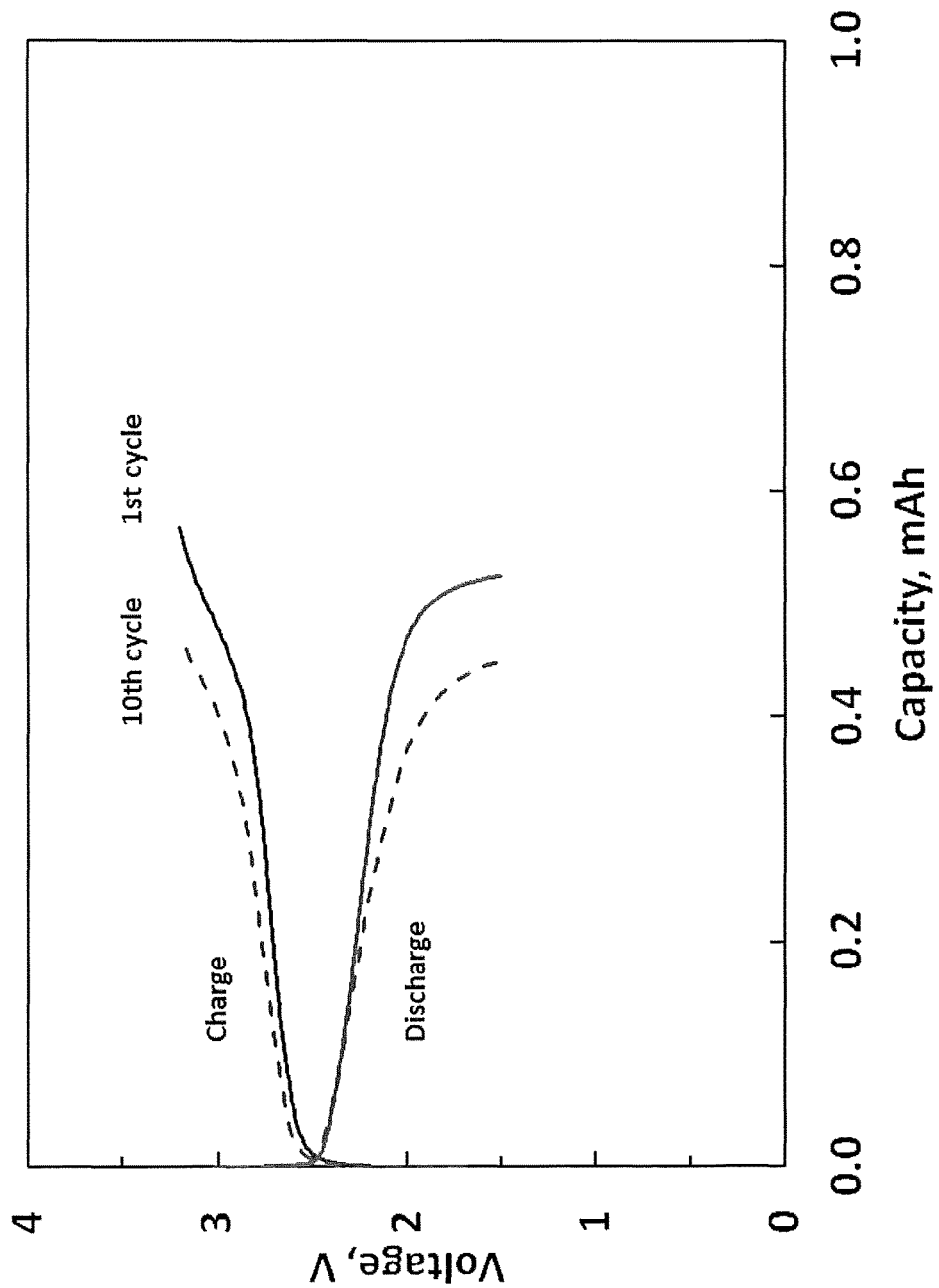
FIG. 2 shows the charge/discharge curves (the $1^{st}$ and the $10^{th}$ cycles) obtained for Example 1.
Figure 3:
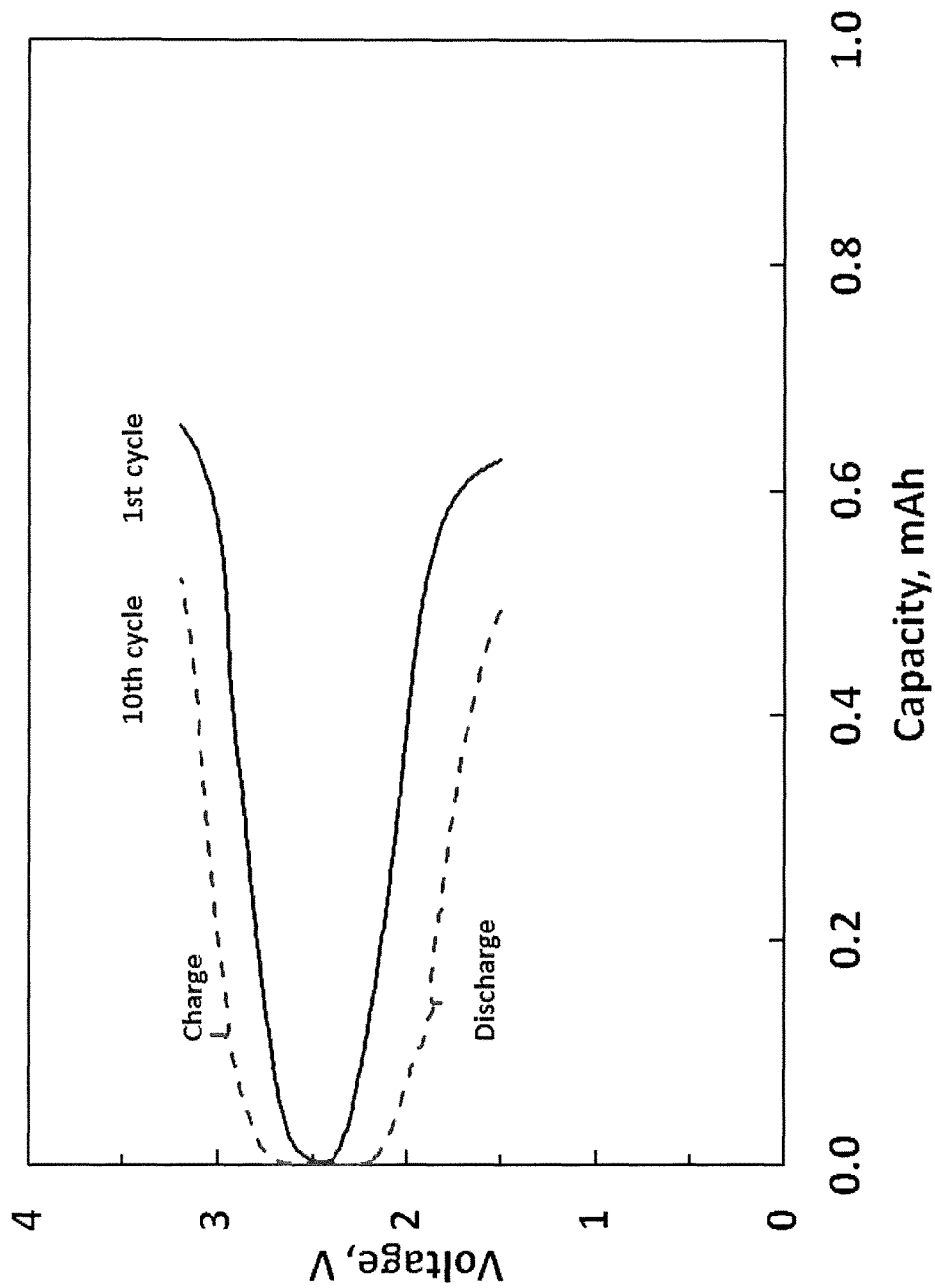
FIG. 3 shows the charge/discharge curves (the $1^{st}$ and the $10^{th}$ cycles) obtained for Example 2.
Figure 4:
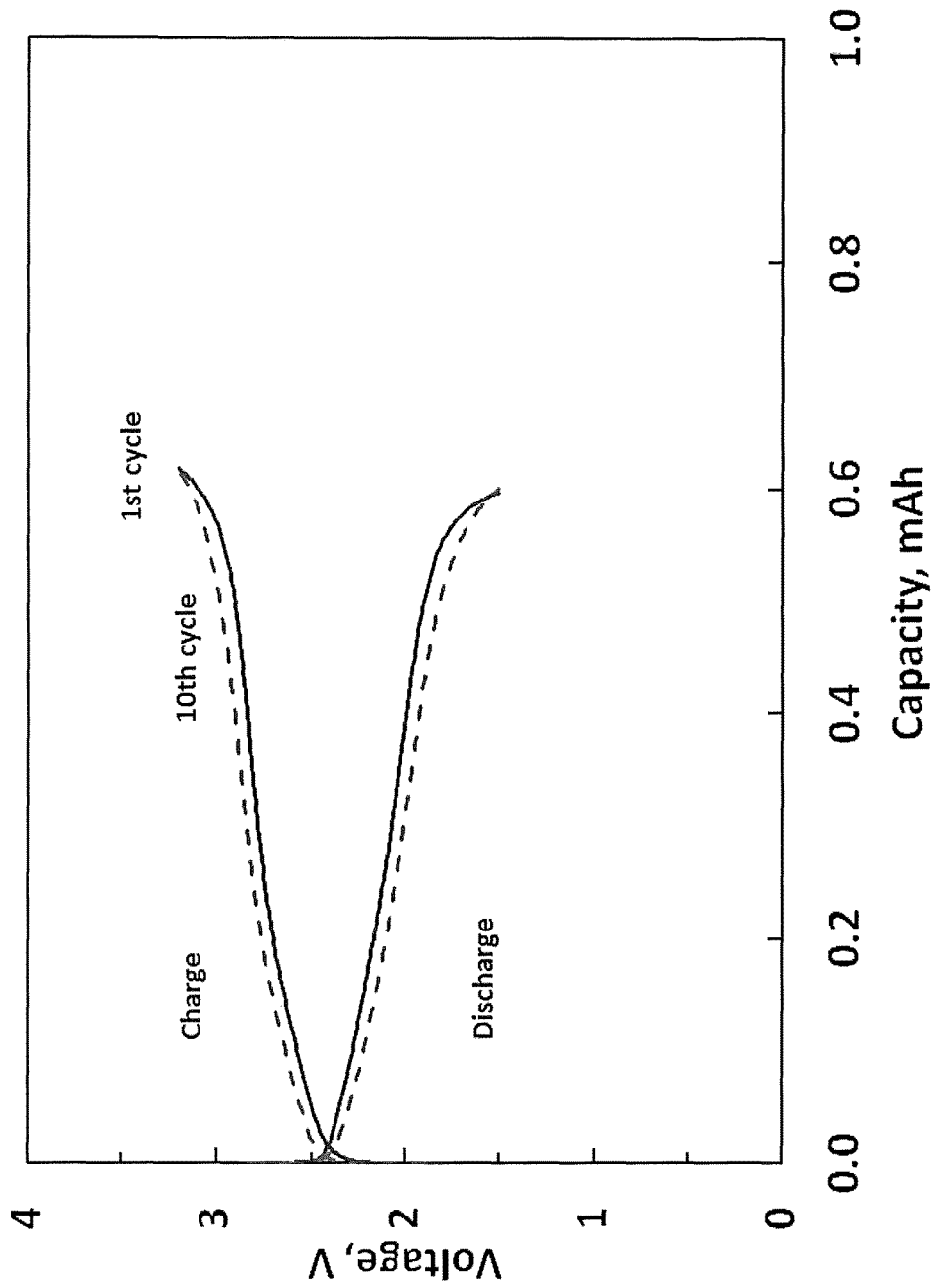
FIG. 4 shows the charge/discharge curves (the $1^{st}$ and the $10^{th}$ cycles) obtained for Example 3.
Figure 5:
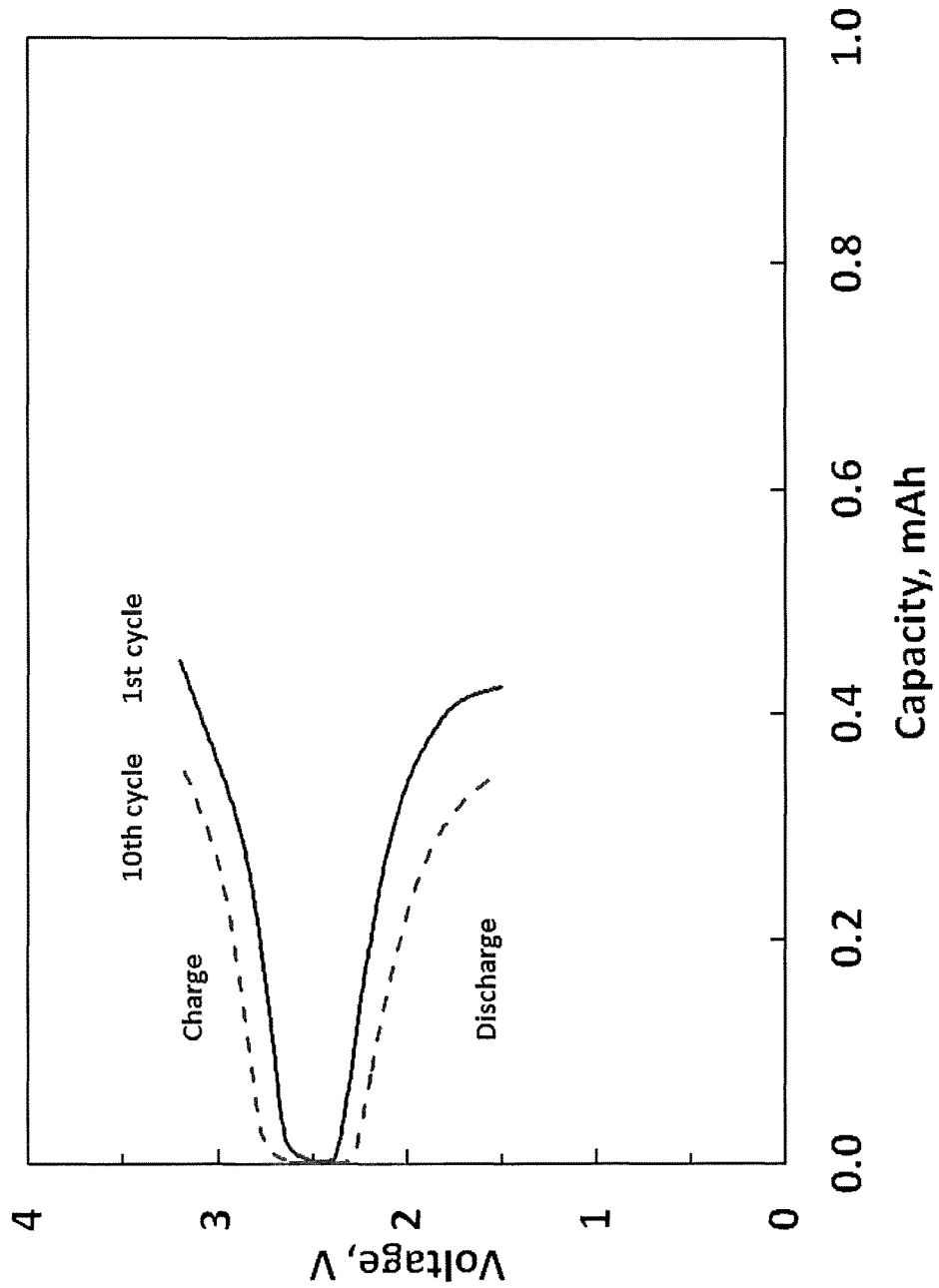
FIG. 5 shows the charge/discharge curves (the $1^{st}$ and the $10^{th}$ cycles) obtained for Example 4.

| Example | Lithium salt (molar ratio) | Ether (molar ratio) | Water (molar ratio) | Charge/discharge curve |
|---|---|---|---|---|
| 1 | LiTFSI (1) | DME (1) | (1) | FIG. 2 |
| 2 | LiTFSI (1) | Tetraglyme (1) | (1) | FIG. 3 |
| 3 | (2) | Tetraglyme (2) | (1) | FIG. 4 |
| 4 | LiTFSI (1) | THF (1) | (1) | FIG. 5 |
| 5 | LiTFSI (1) | Polyethylene glycol dimethyl ether (average M$_n$ - 500) (approximately 12 EO units) | (1) | FIG. 6 |

FIGS. 2-6 show that the lithium ion batteries according to the described embodiments could perform high discharge voltage over 2 V with stable cycling.

The invention claimed is:

1. An aqueous electrolyte for a lithium-ion secondary battery comprising:
water;
at least one of a linear ether and a cyclic ether; and
a lithium salt of an anion comprising a fluoroalkylsulfonvl group of formula (I):

R—SO2-    (I)

wherein R is a perfluoroalkyl group of 1-5 carbons and
wherein a concentration of the lithium salt of an anion comprising a fluoroalkylsulfonyl group of formula (I) is from 2M to 20 M.

2. The aqueous electrolyte for a lithium secondary battery of claim 1, wherein the lithium salt of an anion comprising a fluoroakylsulfonyl group of formula (I) is at least one salt selected from the group consisting of lithium bis(trifluoromethyl-sulfonyl)imide (LiTFSI), lithium bis(pentafluoroethyl-sulfonyl)imide (LiBETI), lithium bis(fluoromethylsulfonyl)imide (LiFSI) and lithium trifluoromethylsulfonate (LiTFS).

3. The aqueous electrolyte for a lithium secondary battery of claim 1, wherein the at least one of a linear and cyclic ether is selected from the group consisting of dimethoxyethane (DME, Glyme), diethylene glycol dimethyl ether (Diglyme), triethylene glycol dimethyl ether (Triglyme), tetraethylene glycol dimethyl ether (Tetraglyme), polyethylene glycol dimethyl ether (PEG) and tetrahydrofuran (THF).

4. The aqueous electrolyte for a lithium secondary battery of claim 1, wherein relative mole ratios of ether (Y) and water (Z) to Li-salt (X) satisfy the following formulas:

Y/X is from 1/10 to 50/1; and

Z/X is from 1/10 to 5/1.

5. A lithium ion battery comprising:
an anode capable of intercalation and de-intercalation of lithium ions;
a cathode comprising an active material selected from the group consisting of LiMn$_2$O$_4$, LiCoO$_2$, LiFe(PO$_4$), LiMn$_{1/3}$Ni$_{1/3}$Co$_{1/3}$O$_2$, LiNi$_{0.5}$Mn$_{1.5}$O$_4$ and LiCoPO$_4$; and
an aqueous electrolyte in contact with the anode and cathode which comprises:
water;
at least one of a linear ether and a cyclic ether; and
a lithium salt of an anion comprising a fluoroalkylsulfonyl group of formula (I):

R—SO2-    (I)

wherein R is a perfluoroalkyl group of 1-5 carbons, and
wherein relative mole ratios of ether (Y) and water (Z) to Li-salt of formula satisfy the following formulas:

Y/X is from 1/10 to 50/1; and

Z/X is from 1/10 to 5/1.

6. The lithium ion battery of claim 5, wherein the lithium salt of an anion comprising a fluoroalkylsulfonyl group of formula (I) is at least one salt selected from the group consisting of lithium bis(trifluoromethyl-sulfonyl)imide (LiTFSI), lithium bis(pentafluoroethyl-sulfonyl)imide (Li-BETI), lithium bis(fluoromethylsulfonyl)imide (LiFSI) and lithium trifluoromethylsulfonate (LiTFS).

7. The lithium ion battery of claim 5, wherein the at least one of a linear and cyclic ether is selected from the group consisting of dimethoxyethane (DME, Glyme), diethylene glycol dimethyl ether (Diglyme), triethylene glycol dimethyl ether (Triglyme), tetraethylene glycol dimethyl ether (Tetraglyme), polyethylene glycol dimethyl ether (PEG) and tetrahydrofuran (THF).

8. The lithium ion battery of claim 5, wherein
when the ether is a long chain polyethylene glycol dimethyl ether (PEGDME) of the formula:

$CH_3(-O-CH_2-CH_2-)_n OCH_3$,

Y is calculated as n/4.

9. The lithium ion battery of claim 5, wherein a concentration of the lithium salt of an anion comprising a fluoroalkylsulfonyl group of formula (I) is from 2M to 20 M.

10. A vehicle, comprising the battery of claim 5.

* * * * *